Patented May 26, 1931

1,807,570

UNITED STATES PATENT OFFICE

BRADLEY DEWEY, OF CAMBRIDGE, MASSACHUSETTS, ASSIGNOR TO DEWEY AND ALMY CHEMICAL COMPANY, OF NORTH CAMBRIDGE, MASSACHUSETTS, A CORPORATION OF MASSACHUSETTS

SELF DEODORIZING SEALING COMPOSITION

No Drawing.    Application filed February 14, 1928.   Serial No. 254,320.

My invention relates to closures which are free from objectionable odors, for glass or metal containers.

For many years, attempts have been made to use various animal proteins such as glue, gelatine, casein, hæmoglobin, etc., as container closures. However, these attempts have been invariably unsuccessful when the container is used to hold food or other products which are rendered useless or of less value by disagreeable odors.

It is well known in the art to deodorize animal proteins by running them through "adsorbents" such as activated charcoal, bone black, silica gel, etc. However, the results of such treatment are not satisfactory for use as container closures due to the following facts.

1. To run through the adsorbent, the proteins must be too dilute for use as seals.
2. The gel structure of the protein (which is essential for a satisfactory seal) is destroyed if the diluted deodorized solution is evaporated until the protein content of the solution is sufficiently high for use as a sealing fluid.
3. The proteins, after having been thus deodorized, sometimes decompose into various ill-smelling amino compounds. Traces of these substances have a strong enough odor to spoil a seal for commercial use.

Sealing materials or compositions are usually applied to a container member, e. g. the peripherally channeled head which is to be secured to a can-body, by flowing or scraping the sealing material into the groove in the container member, and must therefore be of a rather highly viscous fluidity at the temperature determined for its application.

Now I have found that a small quantity of an adsorbent mixed with and retained in the fluid or semi-fluid compound previously to application not only adsorbs the odors present when the adsorbent is added, but also fixes and removes in situ, any nascent odors which may result from progressive or recurrent putrefaction of the compound or of the dried film.

I recommend the following as a good workable formula. To 31 parts of glycerine and 26 parts of cheap animal glue, dissolved, with or without heat, in 21 parts of water, add with stirring 17 parts of whiting and 5 parts of activated charcoal which is so finely subdivided that, apart from its deodorizing function it constitutes a filler which does not interfere with the smoothness of the composition or with the usual modes of application thereof to a container-member. In any case, the adsorbent material should be used in finely comminuted form.

Any animal protein such as glue, gelatin, casein, hæmoglobin, and the like, which form water-gelling solutions may be used and any of the well known adsorbents may be substituted for activated charcoal.

It will be obvious to those skilled in the art that the glycerine, which serves as a softener, may be omitted entirely or replaced wholly or in part by various hygroscopic bodies such as invert sugars, diethylene glycol and the like and that the whiting which serves as a filler may also be omitted or replaced wholly or in part, by one or more pigments.

In the claims which follow, I use the term glue to designate any of the glue-like, water gelling, protein containing, substances which are, in respect to their adhesive qualities and uses, referred to as glue; e. g. gelatin, fish glue, animal glue, vegetable proteid substances, casein, etc.

I claim:

1. A closure sealing composition comprising a body material containing glue and an adsorbent of malodorous gases.

2. A closure sealing composition comprising a body material containing glue and activated charcoal.

3. A closure sealing composition comprising a body material containing glue and adsorbent charcoal.

4. A closure sealing composition comprising a body material containing glue and an adsorbent of malodorous gases, the latter in such fineness of subdivision as not substantially to diminish the smoothness of the composition when in solution.

5. A closure sealing composition comprising a body material containing glue and activated charcoal, the latter in such fineness of subdivision as not substantially to diminish the smoothness of the composition when in solution.

6. A closure sealing composition comprising a body material containing glue and adsorbent charcoal, the latter in such fineness of subdivision as not substantially to diminish the smoothness of the composition when in solution.

Signed by me at Cambridge, Mass., this 31st day of January, 1928.

BRADLEY DEWEY.